United States Patent
Huynh et al.

(10) Patent No.: US 10,605,057 B2
(45) Date of Patent: Mar. 31, 2020

(54) DOWNHOLE-TYPE ELECTRIC SUBMERSIBLE PUMP SYSTEM

(71) Applicant: Upwing Energy, LLC, Cerritos, CA (US)

(72) Inventors: Co Si Huynh, Brea, CA (US); John Stout, Cerritos, CA (US); Patrick McMullen, Yorba Linda, CA (US); Kuo-Chiang Chen, Kennedale, TX (US)

(73) Assignee: Upwing Energy, LLC, Cerritos, CA (US)

( * ) Notice: Subject to any disclaimer, the term of this patent is extended or adjusted under 35 U.S.C. 154(b) by 0 days.

(21) Appl. No.: 15/844,339

(22) Filed: Dec. 15, 2017

(65) Prior Publication Data
US 2018/0171767 A1    Jun. 21, 2018

Related U.S. Application Data

(60) Provisional application No. 62/435,568, filed on Dec. 16, 2016.

(51) Int. Cl.
*H02K 5/132*    (2006.01)
*E21B 43/12*    (2006.01)
(Continued)

(52) U.S. Cl.
CPC .......... *E21B 43/128* (2013.01); *F04C 13/008* (2013.01); *F04D 13/024* (2013.01);
(Continued)

(58) Field of Classification Search
CPC .......... H02K 5/132; H02K 5/136; H02K 3/04; H02K 19/02
(Continued)

(56) References Cited

U.S. PATENT DOCUMENTS 3,283,187 A * 11/1966 Schaefer .............. H02K 5/1285
                                                310/86
4,514,652 A *  4/1985 Olson ................... H02K 5/128
                                                310/113

(Continued)

FOREIGN PATENT DOCUMENTS

GB       2501352 B    11/2017
WO    2004/113670    12/2004

OTHER PUBLICATIONS

PCT International Search Report and Written Opinion in International Application No. PCT/US2017/066799, dated Jul. 24, 2018, 17 pages.

*Primary Examiner* — Michael Andrews
(74) *Attorney, Agent, or Firm* — Fish & Richardson P.C.

(57) ABSTRACT

Certain aspects of the subject matter described here can be implemented in a downhole-type electric submersible pump system. An electric machine can be disposed downhole in a wellbore. The electric machine is coupled to rotate with an impeller that can be disposed downhole in the wellbore. The electric machine includes a stator assembly with at least three stator sections axially arranged and spaced apart from each other along a longitudinal axis of the electric machine. The electric machine also includes a rotor assembly with at least three rotor sections arranged axially along the longitudinal axis of the electric machine. The rotor assembly is carried within and supported to rotate by the stator assembly.

18 Claims, 6 Drawing Sheets

(51) Int. Cl.
  *H02K 1/27*  (2006.01)
  *H02K 5/167*  (2006.01)
  *H02K 7/14*  (2006.01)
  *F04D 13/10*  (2006.01)
  *F04D 13/02*  (2006.01)
  *H02K 1/14*  (2006.01)
  *F04C 13/00*  (2006.01)
  *H02K 19/02*  (2006.01)

(52) U.S. Cl.
  CPC ........... *F04D 13/025* (2013.01); *F04D 13/10* (2013.01); *H02K 1/148* (2013.01); *H02K 1/2733* (2013.01); *H02K 5/1672* (2013.01); *H02K 7/14* (2013.01); *H02K 5/132* (2013.01); *H02K 19/02* (2013.01)

(58) Field of Classification Search
  USPC .............................. 310/86–87, 112, 216.008
  See application file for complete search history.

(56) References Cited

U.S. PATENT DOCUMENTS

| | | | |
|---|---|---|---|
| 6,388,353 B1* | 5/2002 | Liu | F04B 13/00 |
| | | | 310/114 |
| 7,378,769 B2 | 5/2008 | Head | |
| 8,922,087 B1* | 12/2014 | Rittenhouse | H02K 1/148 |
| | | | 310/112 |
| 2007/0029890 A1* | 2/2007 | Deodhar | H02K 21/44 |
| | | | 310/216.074 |
| 2007/0096571 A1* | 5/2007 | Yuratich | E21B 43/128 |
| | | | 310/87 |
| 2010/0019589 A1 | 1/2010 | Saban et al. | |
| 2015/0114632 A1 | 4/2015 | Romer et al. | |

\* cited by examiner

DOWNHOLE-TYPE ELECTRIC SUBMERSIBLE PUMP SYSTEM

CROSS-REFERENCE TO RELATED APPLICATIONS

This application claims the benefit of priority under 35 U.S.C. § 119(e) of U.S. Patent Application Ser. No. 62/435,568, entitled "Electric Machine for Downhole Applications," filed Dec. 16, 2016, which is incorporated herein by reference in its entirety.

BACKGROUND

Most wells behave characteristically different over time, as well as seasonally, due to geophysical, physical, and chemical changes in the subterranean reservoir that feeds the well. For example, it is common for well production to decline as the well reaches the end of its life. This decline in production is due to declining pressures in the reservoir, and can eventually reach a point where there is not enough pressure in the reservoir to push production through the well to the surface. In many wells, an artificial lift system, such as an electric submersible pump (ESP) or other artificial lift system, is sometimes used to extend the life of the well by increasing driving pressure within the well.

SUMMARY

This disclosure relates to electric machines for downhole applications.

An example implementation of the subject matter described within this disclosure is a downhole-type electric submersible pump system with the following features. An electric machine is configured to be disposed downhole in a wellbore. The electric machine is coupled to rotate with an impeller configured to be disposed downhole in the wellbore. The electric machine includes a stator assembly with multiple stator sections axially arranged and spaced apart each other along a longitudinal axis of the electric machine, and electric machine windings with a plurality of conductors. Each conductor spans an entire length of the stator assembly. The electric machine windings are configured to induce a torque in a rotor assembly responsive to receiving electrical power at the stator assembly. The rotor assembly includes multiple rotor sections arranged axially along the longitudinal axis of the electric machine. The rotor assembly is carried within and supported to rotate by the stator assembly.

Aspects of the example implementation, which can be combined with example implementation alone or in combination, include the following. Multiple bore tubes are positioned between the stator assembly and the rotor assembly. The bore tubes support the conductors at respective inner diameters of the electric machine windings.

Aspects of the example implementation, which can be combined with example implementation alone or in combination, include the following. A stator section includes a multiple lamination segments arranged radially around the rotor assembly. The lamination segments are assembled around the conductors.

Aspects of the example implementation, which can be combined with example implementation alone or in combination, include the following. A first stator section of the multiple stator sections is spaced apart along the longitudinal axis of the electric machine from a second stator section of the at least three stator sections by a gap. The system further includes a bearing support member positioned in the gap.

Aspects of the example implementation, which can be combined with example implementation alone or in combination, include the following. The bearing support member is made from an electrically non-conductive material.

Aspects of the example implementation, which can be combined with example implementation alone or in combination, include the following. The bearing support member is positioned around a portion of a conductor between the first stator section and the second stator section.

Aspects of the example implementation, which can be combined with example implementation alone or in combination, include the following. The bearing support member includes multiple teeth separated by a slot. The slot is positioned around a portion of the conductor between the first stator section and the second stator section.

Aspects of the example implementation, which can be combined with example implementation alone or in combination, include the following. An end of a first rotor section and an end of a second rotor section are supported to ride within a bearing.

Aspects of the example implementation, which can be combined with example implementation alone or in combination, include the following. The bearing support member surrounds the bearing and is positioned in the gap between a first stator section and a second stator section. The bearing support member is configured to support the bearing.

Aspects of the example implementation, which can be combined with example implementation alone or in combination, include the following. The electric machine is positioned within a housing. A fluid is within the housing. The fluid is configured to maintain an internal pressure within the housing based on an external pressure within the wellbore in which the electric machine is configured to be disposed.

Aspects of the example implementation, which can be combined with example implementation alone or in combination, include the following. The system further includes an impeller. A magnetic coupling is configured to couple the impeller and the electric machine to transfer a rotation between the impeller and the electric machine.

Aspects of the example implementation, which can be combined with example implementation alone or in combination, include the following. The magnetic coupling includes a male drum mechanically coupled to one of the impeller or the electric rotor assembly. A female drum surrounds the male drum. The female drum is mechanically coupled to the other of the rotor assembly or the impeller. Permanent magnets are positioned radially around the female drum and the male drum. The permanent magnets are configured to magnetically couple the male drum and the female drum. The permanent magnets are configured to exchange torque between the male drum and the female drum.

Aspects of the example implementation, which can be combined with example implementation alone or in combination, include the following. An isolation barrier fluidically isolates the male drum and the female drum from each other.

Aspects of the example implementation, which can be combined with example implementation alone or in combination, include the following. The isolation barrier includes a non-magnetic material, non-metallic material, metallic material, or composite material.

Aspects of the example implementation, which can be combined with example implementation alone or in combination, include the following. The isolation barrier includes a fiberglass composite, a carbon fiber composite, or graphite.

An example implementation of the subject matter described within this disclosure is a downhole-type electric submersible pump system with the following features. An electric machine is configured to be disposed downhole in a wellbore. The electric machine is coupled to rotate with an impeller configured to be disposed downhole in the wellbore. The electric machine includes a stator assembly with a one or more of stator sections axially arranged and spaced apart along a longitudinal axis of the electric machine. A rotor assembly includes one or more of rotor sections arranged axially along the longitudinal axis of the electric machine. The rotor assembly is carried within and supported to rotate by the stator assembly. A magnetic coupling includes a male drum mechanically coupled to one of the impeller or the rotor assembly. A female drum surrounds the male drum. The female drum is mechanically coupled to the other of the rotor assembly or the impeller. An isolation barrier is between the male drum and female drum. The isolation barrier is configured to fluidically isolate the female drum from the male drum, the electric machine is positioned within a housing.

Aspects of the example implementation, which can be combined with the example implementation alone or in combination, include the following. The rotor assembly is supported on magnetic bearings.

Aspects of the example implementation, which can be combined with the example implementation alone or in combination, include the following. The rotor assembly is supported on fluid-film bearings.

Aspects of the example implementation, which can be combined with the example implementation alone or in combination, include the following. The male drum and female drum are supported on magnetic bearings.

Aspects of the example implementation, which can be combined with the example implementation alone or in combination, include the following. The male drum and female drum are supported on mechanical bearings.

Aspects of the example implementation, which can be combined with the example implementation alone or in combination, include the following. The housing contains a fluid. The fluid within the housing is configured to maintain an internal pressure within the housing based on an external pressure within the wellbore.

Aspects of the example implementation, which can be combined with the example implementation alone or in combination, include the following. The housing contains a fluid. The fluid within the housing is configured to maintain an internal pressure within the housing independent of an external pressure within the wellbore.

Aspects of the example implementation, which can be combined with the example implementation alone or in combination, include the following. The male drum is mechanically coupled to the rotor assembly and the female drum mechanically coupled to the impeller.

An example implementation of the subject matter described within this disclosure is a method with the following features. Current is flowed across stators within an electric machine. The current flows through a winding extending across the stators within the electric machine. Electric rotors are rotated in unison within the stators either to cause the current to flow across the plurality of stators or in response to flowing the current across the stators. Rotating the electric rotors in unison generates torque. the torque is exchanged through a coupling that connects the electric rotors with a fluid rotor.

Aspects of the example implementation, which can be combined with the example implementation alone or in combination, include the following. The electric machine is a motor. The electric rotors are rotated in unison in response to flowing the current across the plurality of stators.

Aspects of the example implementation, which can be combined with the example implementation alone or in combination, include the following. The electric machine is a generator. The electric rotors are rotated in unison to cause current to flow across the stators.

The details of one or more implementations of the subject matter described in this disclosure are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
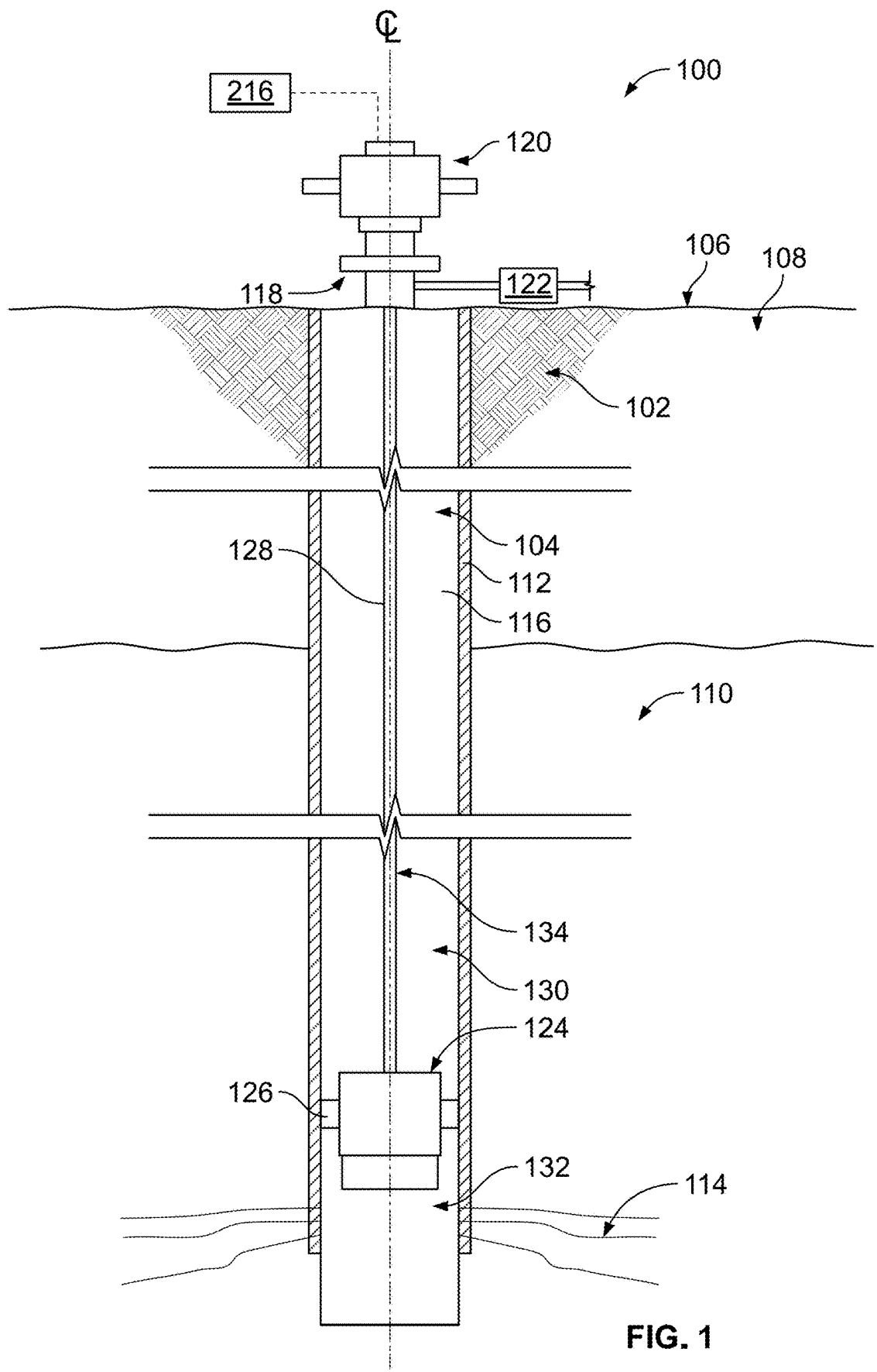
FIG. 1 is a schematic side view of an example well system including a downhole pump.

FIG. 1 depicts an example well system 100 constructed in accordance with the concepts herein. The well system 100 includes a well 102 having a wellbore 104 that extends from the terranean surface 106 through the earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth defining a reservoir, but in other instances, the zone 110 can be multiple formations or a portion of a formation. For simplicity sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is an oil well that is used in producing liquid hydrocarbons from the subterranean zones of interest 110 to the surface 106. While termed an "oil well," the well need not produce only dry oil, and may incidentally or in much smaller quantities, produce water and/or gas. In certain instances, the production from the well 102 can be multiphase in any ratio, and/or despite being an oil well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to oil wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downward into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadingly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

FIG. 1 shows a downhole-type electric submersible pump system 124 residing in the wellbore 104, for example, at a depth that is nearer to subterranean zone 110 than the terranean surface 106. The downhole-type electric submersible pump system 124, being of a type configured in size and robust construction for installation within a well 102, operates to pump fluid in the wellbore 104 to the surface. In particular, casing 112 is commercially produced in a number of common sizes specified by the American Petroleum Institute (the "API), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole-type electric submersible pump system 124 can be configured to fit in, and (as discussed in more detail below) in certain instances, seal to the inner diameter of one of the specified API casing sizes. Of course, the downhole-type electric submersible pump system 124 can be made to fit in and, in certain instances, seal to other sizes of casing or tubing or otherwise seal to the wall of the wellbore 104.

Additionally, as a downhole type pump system 124, the construction of its components are configured to withstand the impacts, scraping, and other physical challenges the pump system 124 will encounter while being passed hundreds of feet/meters or even multiple miles/kilometers into and out of the wellbore 104. For example, the downhole-type electric submersible pump system 124 can be disposed in the wellbore 104 at a depth exceeding 15,000 feet (4572 meters). Beyond just a rugged exterior, this encompasses having certain portions of its electronics being ruggedized to be shock resistant and remain fluid tight during such physical challenges and during operation. Additionally, the downhole-type electric submersible pump system 124 is configured to withstand and operate for extended periods of time (e.g., multiple weeks, months or years) at the pressures and temperatures experienced in the wellbore 104, which temperatures can exceed 400° F./205° C. Finally, as a downhole type pump system 124, the pump system 124 can be configured to interface with one or more of the common deployment systems, such as jointed tubing (i.e., lengths of tubing joined end-to-end, threadingly and/or otherwise), coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., positioning connector 728 discussed below, which can be a jointed tubing connector, coiled tubing connector, or wireline connector). In FIG. 1, the pump system 124 is shown deployed on wireline 128.

In some implementations, the well system 100 can also include a surface pump 122 residing on the terranean surface 106 and fluidly coupled to the well 102 through the Christmas tree 120. The surface pump 122 can include a variable speed or fixed speed pump. The surface pump 122 operates by creating an additional pressure differential within the well 102.

FIG. 1 shows the downhole-type electric submersible pump system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Although FIG. 1 includes both the surface pump 122 and the pump system 124, in other instances, the surface pump 122 can be omitted and the pump system 124 can provide the entire pressure boost in the well 102.

The downhole-type electric submersible pump system 124 locally alters the pressure, temperature, and/or flow rate conditions of the fluid in the wellbore 104 proximate the pump system 124 (e.g., at the base of the wellbore 104). In certain instances, the alteration performed by the pump system 124 can optimize or help in optimizing fluid flow through the wellbore 104. As described above, the downhole-type electric submersible pump system 124 creates a pressure differential within the well 102, for example, particularly within the wellbore 104 the pump system 124 resides in. In some instances, a pressure at the base of the wellbore 104 is a low pressure (e.g., sub-atmospheric); so unassisted fluid flow in the wellbore can be slow or stagnant. In these and other instances, the downhole-type electric submersible pump system 124 introduced to the wellbore 104 adjacent the perforations 114 can reduce the pressure in the wellbore 104 near the perforations 114 to induce greater fluid flow from the subterranean zone 110, increase a temperature of the fluid entering the pump system 124 to reduce condensation from limiting production, and increase a pressure in the wellbore 104 uphole of the pump system 124 to increase fluid flow to the surface 106.

The pump system 124 moves the fluid at a first pressure downhole of the pump to a second, higher pressure uphole of the pump system 124. The pump system 124 can operate at and maintain a pressure ratio across the pump system 124 between the second, higher uphole pressure and the first, downhole pressure in the wellbore. The pressure ratio of the second pressure to the first pressure can also vary, for example, based on an operating speed of the pump system 124, as described in more detail below.

The downhole-type electric submersible pump system 124 can operate in a variety of downhole conditions of the wellbore 104. For example, the initial pressure within the wellbore 104 can vary based on the type of well, depth of the well 102, production flow from the perforations into the wellbore 104, and/or other factors.

Figure 2A:
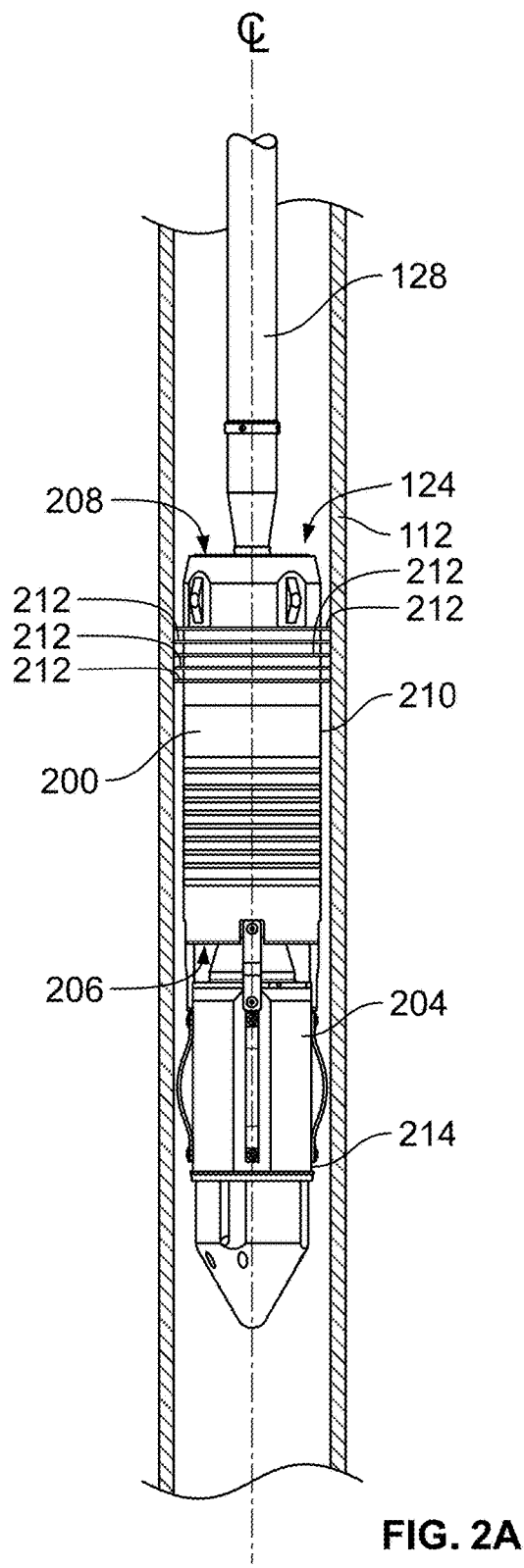
FIGS. 2A and 2B are partial side views of example downhole-type electric submersible pump systems in a wellbore.

The pump system 124 is shown schematically in FIG. 1. FIG. 2A is a partial side view of the example pump system 124 disposed in the casing 112 of the wellbore 104 of FIG. 1. Referring to both FIGS. 1 and 2A, the example pump system 124 includes a pump 200 and an electric machine 204. The pump 200 includes an inlet 206 to receive a fluid at the first pressure downhole of the pump 200 and an outlet 208 to output the fluid at the second, higher pressure uphole of the pump 200. A pump housing 210 houses an impeller (not shown) in fluid communication with the inlet 206 to receive the fluid from the wellbore 104 at the first pressure downhole of the pump 200 and to direct the fluid to the outlet 208 at the second, higher pressure uphole of the pump 200. With the pump system 124 residing in the wellbore 104, the inlet 206 is at a downhole end of the pump 200, and the outlet 208 is at an uphole end of the pump 200. In some instances, the pump system 124 can be positioned in the well with the downhole inlet 206 positioned adjacent to the perforations 114 in the wellbore 104. For example, the pump 200 can be positioned in the wellbore 104 such that the inlet 206 is disposed next to and immediately uphole of the perforations 114 to maximize or improve the fluid flow from the perforations into the pump 200. In some examples, the inlet 206 may not be adjacent to perforations 114, such as the inlet 206 being positioned greater than about twenty feet away from the perforations 114. In some instances, a speed of the pump 200 is adjusted based on the fluid flow from the subterranean zone into the wellbore 104 (e.g., via perforations 114). For example, as the fluid flow from the subterranean zone into the wellbore 104 decreases, a speed of the pump 200 can increase to draw more fluid flow from the subterranean zone into the wellbore 104.

The pump system 124 moves the fluid from the downhole inlet 206 at the first pressure to the uphole outlet 208 at the second, higher pressure. This pressure differential promotes the fluid flow to move uphole of the pump system 124, for example, at a higher flow rate compared to a flow rate in a wellbore without a downhole-type pump. The pump 200 can operate at a variety of speeds, where operating at higher speeds increases fluid flow, and at lower speed reduces fluid flow. For example, the impeller of the pump 200 can operate at speeds up to 20,000 revolutions per minute (rpm).

The electric machine 204 is connected to the pump 200 to drive the pump 200. The electric machine 204 can include an electric motor, such as a sensor less motor, a synchronous motor, and/or other electric motor type. For example, the electric motor can include a permanent magnet motor, a four-pole electric motor, and/or other electric motor arrangement. The electric machine 204 can connect to the pump 200 in a variety of ways. In some examples, the electric machine 204 can include a direct-drive electric motor coupled to a rotor of the pump 200, as described in more detail below, or the electric machine 204 and pump 200 can connect without a direct-drive arrangement. For example, the electric machine 204 can connect to a rotor of the pump 200 on a single, unitary shaft, with a shaft-rotor coupling or other 1:1 gear train, without a gearbox, or using another arrangement type, as described in more detail below. In some examples, as explained in more detail below, the electric machine 204 is an electric motor and a generator, where the electric machine 204 can operate in an electric motor mode to provide energy or a generator mode to receive energy. Although the electric machine 204 is shown in FIG. 2A as disposed downhole of the pump 200, the electric machine 204 can be positioned elsewhere, for example, uphole of the pump 200 or integral with the pump 200. The electric machine 204 can include a motor housing 214 to house the electric machine 204 (e.g., electric motor). In some instances, the motor housing 214 surrounds the electric motor of the electric machine, and absorbs heat (e.g., excess heat) from the electric motor during operation of the electric motor. The motor housing 214 can conduct heat from the electric motor of the electric machine 204 to the process fluid in the wellbore 104, for example, to increase a temperature of the fluid in the wellbore 104 close to and in contact with the motor housing 214. In some examples, the housing 214 is not thermally insulated from a stator of the electric motor and/or other heat producing portions of the electric motor. For example, the stator can be in conductive heat transfer with the housing 214, and in some instances, touching along its entire length or nearly its entire length fins on an exterior of the housing 214, where the fins contact the fluid in the wellbore 104. In certain instances, the portion of the housing 214 that contacts the fluid is above the motor, so as heat rises, it is transferred at least in part to the process fluid in the wellbore 104.

As shown, the electric machine 204 connects to a power source 216 at the well terranean surface 106 via conductor wires (not shown) adjacent to or within the conveyance 134 (e.g., wireline 128) extending between the electric machine 204 and the well surface 106. In some instances, the electric machine 204 includes a power source integral to or adjacent to the electric machine 204 to power the electric machine 204 to drive the pump 200. For example, the power source can include the generator, as described both above and below, and/or a local power source (e.g., battery) disposed downhole in the wellbore 104.

In the example well system 100 of FIG. 1, the pump system 124 is supported in the wellbore 104 at least in part by a blind conveyance 134, which extends from the surface of the well 102 to support the pump system 124. The blind conveyance 134 connects to the pump system 124 and supports the pump system 124 within the wellbore 104, and excludes a fluid flow pathway for fluid flow. For example, the blind conveyance 134 excludes a production tubing that connects an interior of the production tubing to a fluid flow outlet of the pump system 124. Instead, the blind conveyance 134 supports the pump system 124 in the wellbore without taking in the fluid flow output from the pump system 124. For example, the blind conveyance 134 can include the common deployment systems discussed above, such as coiled tubing, jointed tubing, or wireline 128. In some instances, the blind conveyance 134 includes a seal passageway for electrical conductors extending between a surface of the well 102 and the pump system 124. In the example well system 100 of FIG. 1, the blind conveyance 134 includes the wireline 128.

Figure 2B:
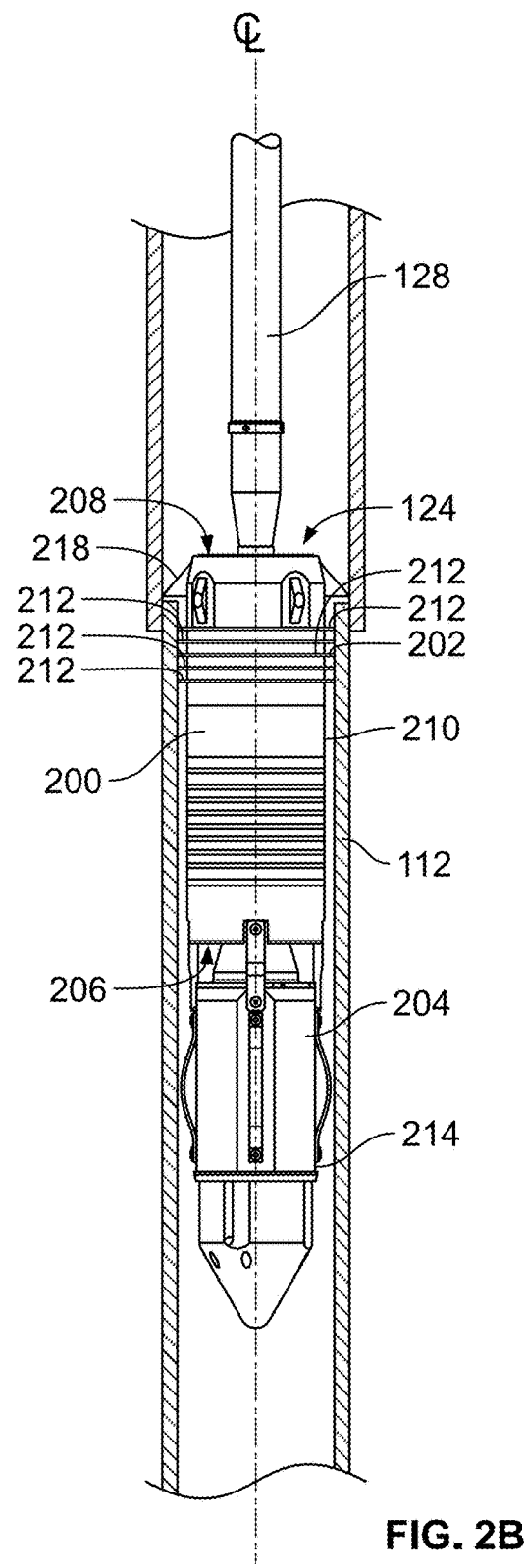

In some instances, as shown in FIG. 2B, the pump system 124 is supported in the wellbore 104 at least in part by a solid stop 218 against a wall of the wellbore 104 or casing 112. FIG. 2B is a partial side view of the example pump system 124 disposed in the casing 112 of the wellbore 104 of FIG. 1. The pump system 124 of FIG. 2B is the same as the pump system 124 of FIG. 2A, except that the pump system 124 is supported in the wellbore 104 by the solid stop 218. The solid stop 218 functions to support the pump system 124 in the wellbore 104 with or without a conveyance from a top surface of the well 102. The solid stop 218 is shown schematically in FIG. 2B, but the solid stop 218 can take a variety of forms. For example, the solid stop 218 can include a collar stop, a shoulder of the pump assembly 124 configured to engage an annular seat in the casing 112, a spider configured to engage a wall of the wellbore 104 (e.g., the casing 112 and/or other wall), slips that actuate to grip the wall of the wellbore 104 (e.g., the casing 112 and/or other wall), and/or another solid stop type.

The pump system 124 outputs a fluid flow uphole of the pump system 124 toward the terranean surface 106 of the well 102. The fluid flow is outputted from the pump system 124 to a conduit, such as a production tubing or coiled tubing. In some implementations, the downhole-type pump system 124 can be deployed with coiled tubing.

Figure 3:
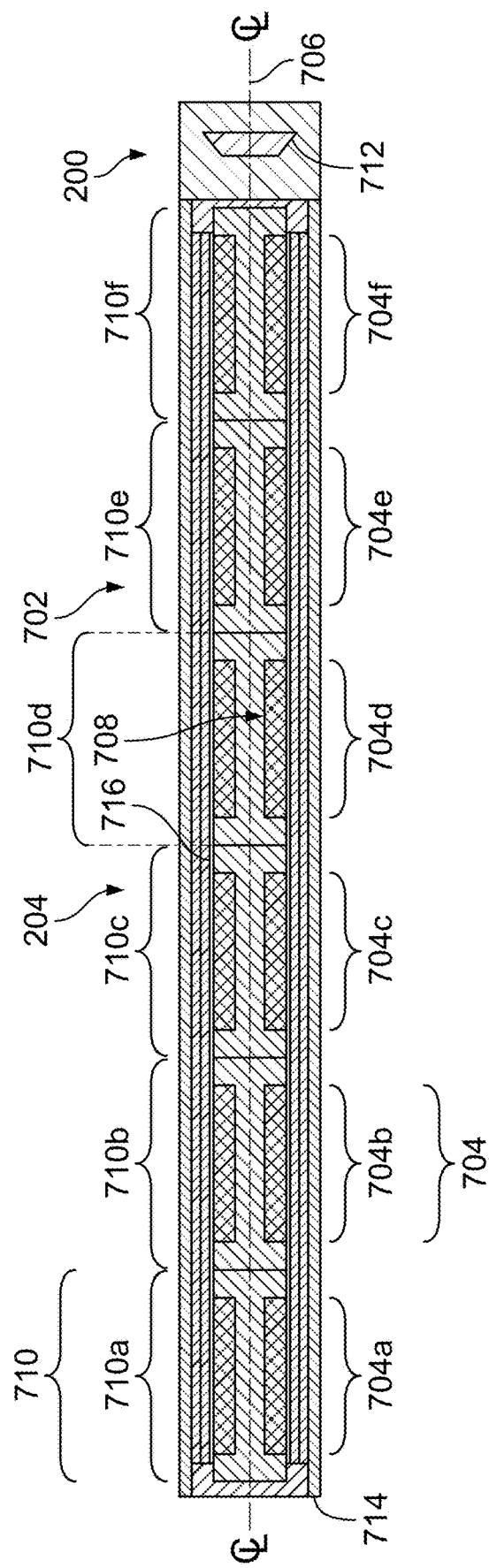
FIG. 3 is a schematic side cross-sectional view of an example electric machine that can be used in a downhole-type pump.

FIG. 3 shows a schematic, half cross sectional view of the downhole-type electric submersible pump system 124. The downhole type electric submersible pump system 124 includes an electric machine 204. The electric machine 204 is coupled to a pump section 200 that houses a rotatable impeller 712. The electric machine 204 includes a stator assembly 702 with at least three stator sections 704 axially arranged and spaced apart from one other along a longitudinal axis 706 of the electric machine 204. Within the stator assembly 702 is a rotor assembly 708 carried within and supported to rotate by the stator assembly 702. The rotor assembly 708 includes at least three individual rotor sections 710 arranged axially along the longitudinal axis 706 of the electric machine 204. For example, the stator assembly may include a first stator section 704*a*, a second stator section 704*b*, a third stator section 704*c*, a fourth stator section 704*d*, a fifth stator section 704*e*, and a sixth stator section 704*f*. The electric machine has the same number of rotor sections 710 to complement the stator sections 704, such as a first rotor section 710*a*, a second rotor section 702*b*, a third rotor section 710*c*, a fourth rotor section 710*d*, a fifth rotor section 710*e*, and a sixth rotor section 710*f*. While the illustrated implementation utilizes six rotor sections 710 and six stator sections 704, any number rotor sections 710 and stator sections 704 (i.e., at least two or more each) can be used. As more sections are added to the electric machine 204, the torque that the electric machine 204 can generate when used as a motor increases. Conversely, more sections can lead to greater current production when the electric machine 204 is used as a generator. In some implementations, a thrust bearing can be included at an end of the electric machine 204. The thrust bearing is capable of supporting any axial loads within the electric machine 204. In some implementations, the thrust bearing can be a mechanical bearing, such as a tilting pad bearing, or a magnetic thrust bearing.

Figure 4:
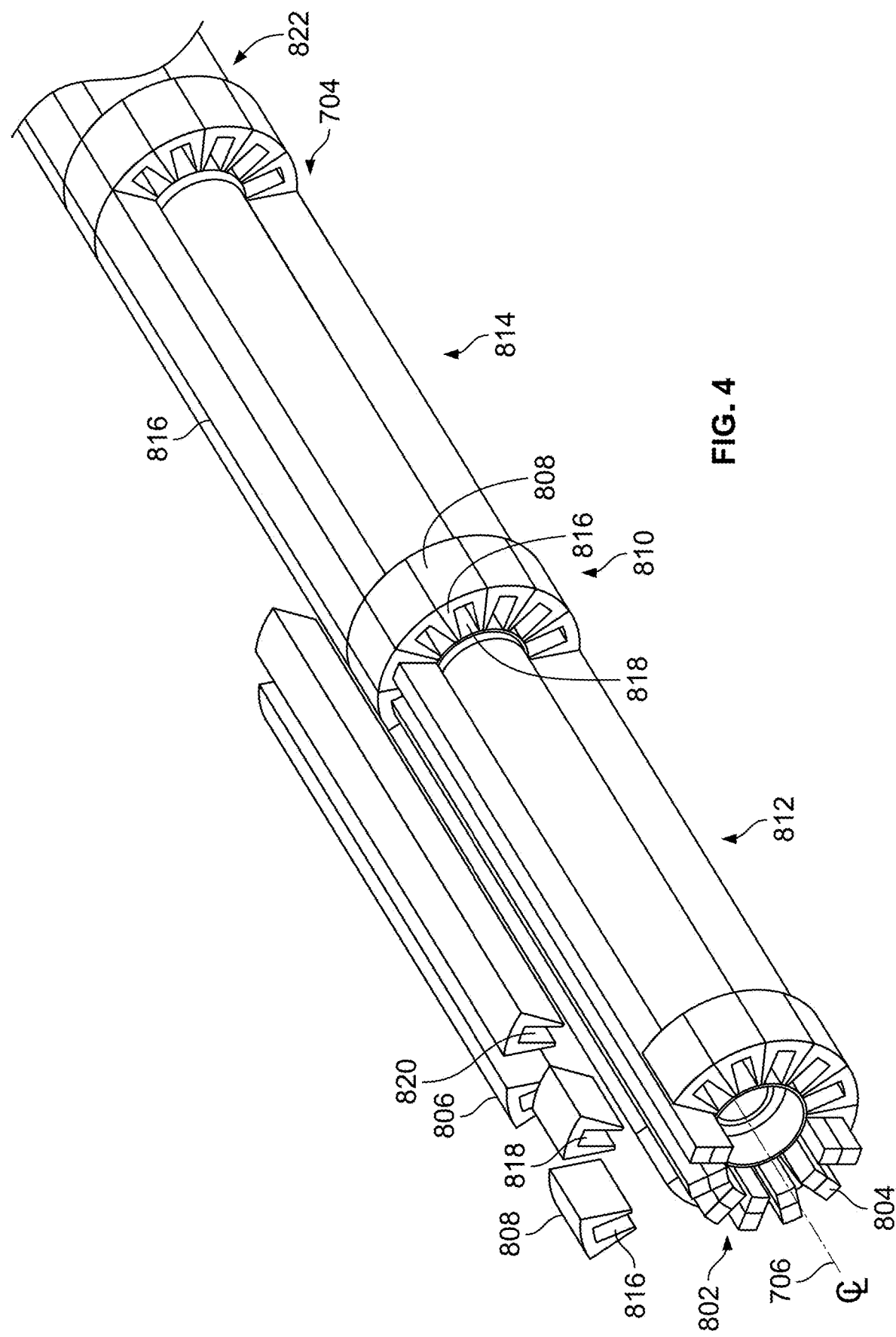
FIG. 4 is a schematic diagram of an exploded view of an example stator assembly.

FIG. 4 shows an isometric exploded view of the stator assembly 702. The electric machine 204 includes windings 802. The windings 802 include multiple conductors 804. Each conductor 804 spans an entire length of the stator assembly 702 across multiple stator sections 704. In some instances, each conductor 804 includes a single, continuous conductive element extending across multiple stator sections 704. In some implementations, the windings 802 can induce a torque in the rotor assembly 708 in response to receiving electrical power at the stator assembly 704. In some implementations, a rotor assembly 708 can induce a current in the windings 802 when a rotation is applied to the rotor assembly 708. Each conductor is coated with a thin layer of insulation material appropriate for the service of the electrical machine. For example, the conductor may have a medium voltage rated insulation with an "H" temperature rating, or any other insulation with a voltage and temperature rating. The angular relationship between sections of stator can also be offset, or skewed, in relation to the other sets to provide reduced cogging and torque ripple produced by the electric machine when operating as a motor, or to compensate for angular deformation/deflection of the rotor to rotor coupling or housing due to motor torque. For example, a first stator section can be angularly offset from a second stator by between 1° and 15° degrees. Such a correction can also be accomplished by offsetting the rotor sections angularly in relation to each other. For example, a first rotor section can be angularly offset from a second rotor by between 1° and 15° degrees.

A stator section 704 includes multiple lamination segments 806 arranged radially around the rotor assembly 708. A lamination segment 806 is positioned around each of the conductors 804. Each lamination segment 806 includes a slot 818 configured to receive and surround a conductor 804. The lamination segments 806 are constructed out of a magnetically conductive material, such as iron or an iron alloy. As illustrated, the lamination segments 806 have a truncated circular-section cross-section with a notch 820 configure to receive and surround the windings 804.

In some implementations, when the electric machine 204 is being used as a motor, the electric machine 204 can utilize a direct current (DC) to operate. In some implementations, the electric machine 204 can utilize a single phase alternating current (AC) or a multi-phase AC to operate. The electric machine 204 can be built with any even number of poles, such as 4 poles. In the illustrated implementation, the electric machine 204 is a 4 pole electric machine that utilizes three-phase AC to power the electric machine 204. As there are three phases and four poles in the illustrated electric machine 204, there are also twelve lamination segments 806 per stator section 704 and twelve sets of conductors 804 for the stator assembly 702. In other implementations, the electric machine 204 can be configured to meet many different power requirements. For example, two pole single-phase AC, or any other combination of poles and power. A different number of conductors and lamination segments will be needed depending upon the power configuration of the electric machine 204.

The system further includes a bearing support member 808 positioned in a gap 810 between each stator section 704. The bearing support member 808 is made from a non-magnetic material. In some implementations, the bearing support member 808 can be made of a dielectric material, such as PEEK™, Viton™, or any other dielectric material. In some implementations, the bearing support member 808 can be Inconel or any other non-magnetic alloy. The bearing support member 808 is positioned around a portion of a conductor 804 between the first stator section 812 and the second stator section 814. The bearing support members 808 each include teeth 816 separated by a slot 818. As illustrated, the bearing support members have the same cross-sectional shape as the lamination segments 806. The slot 818 is positioned around the portion of the conductor 804 between the first stator section 812 and the second stator section 814. Multiple bearing support members 808 are used within the gap between each stator section 704, such as between the second stator section 814 and a third stator section 822. As illustrated, there is one bearing support member 808 per winding 802. In some implementations, there can be more bearing support members than windings 802.

Figure 5:
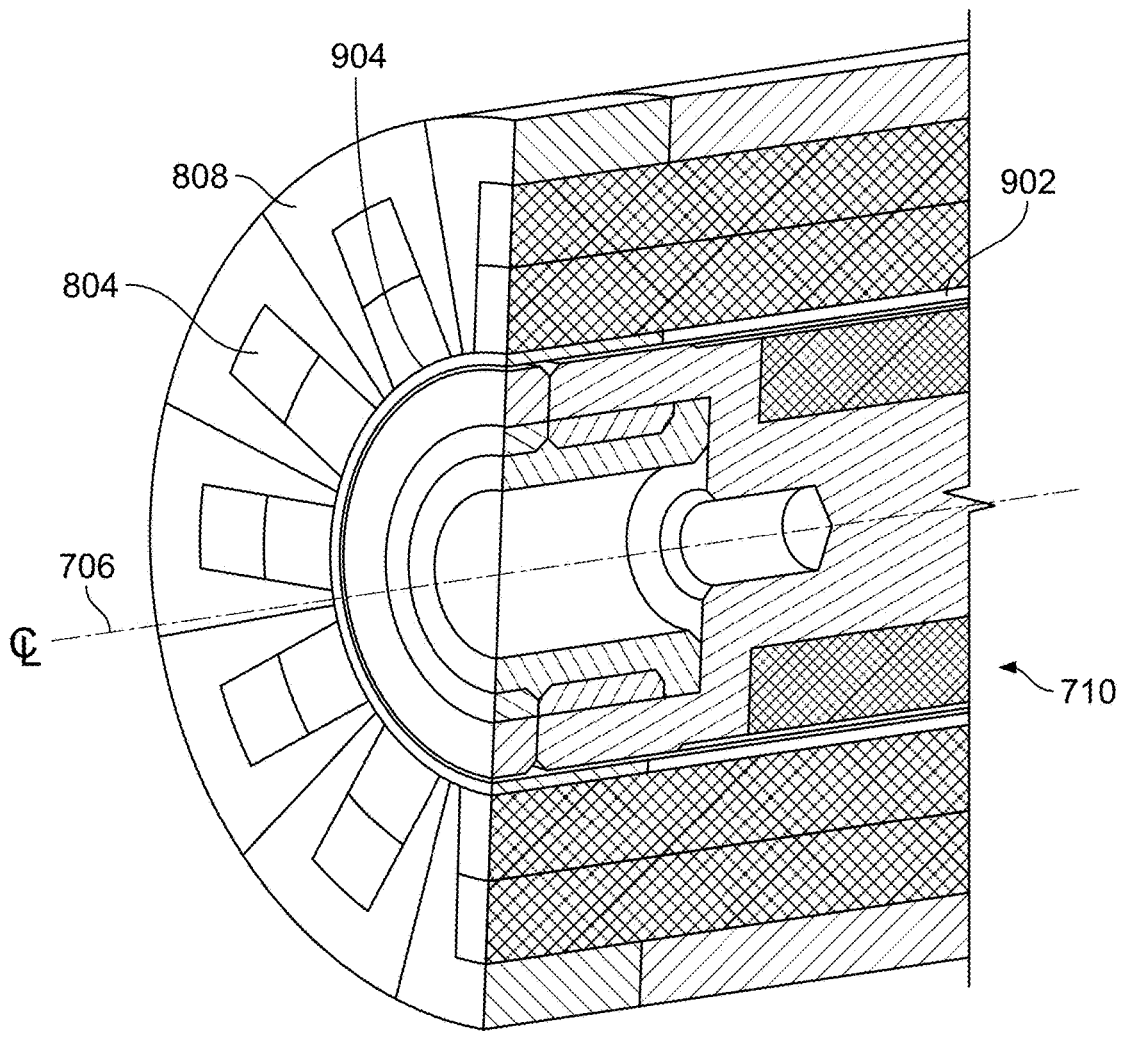
FIG. 5 is a schematic of an isometric side cross-sectional view of an example electric machine.

FIG. 5 shows an isometric cross sectional view of the electric machine 204. The electric machine 204 can also include multiple bore tubes 902 positioned between the stator assembly 702 and the rotor assembly 708. In other words, the bore tubes 902 surround the rotor assembly 708. That is, the bore tubes 902 line an inner diameter of the stator assembly 702. The bore tubes 902 support the conductors 804 at respective inner diameters 904 of the windings 802. The bore tubes 902 are constructed of a non-conductive material. In some implementations, the bore tubes can be constructed of fiberglass or any other non-conductive material.

Figure 6:
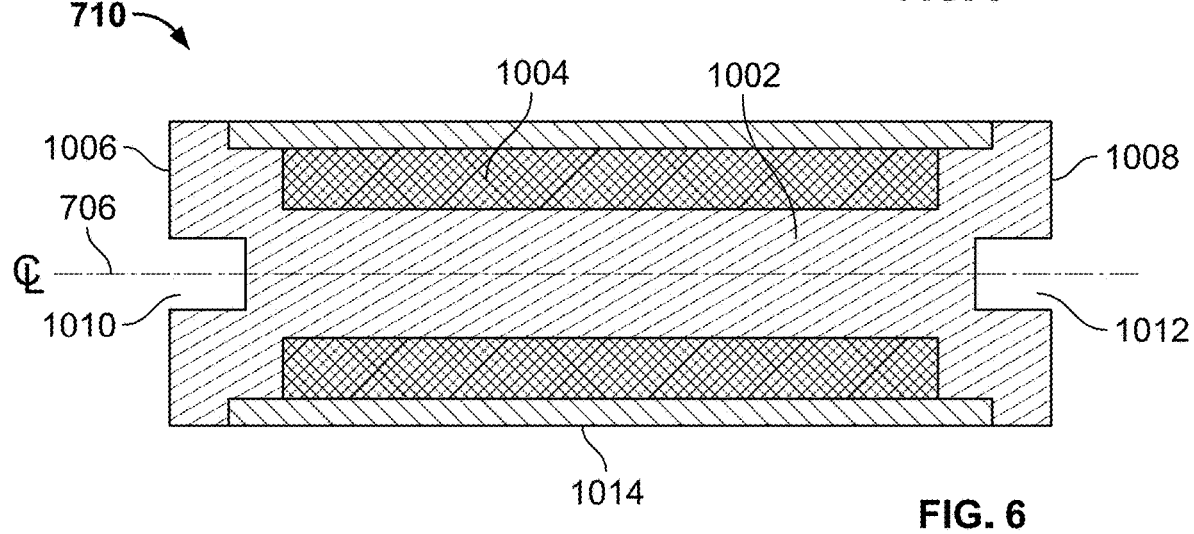
FIG. 6 is a schematic diagram of a side cross-sectional view of an example rotor segment.

FIG. 6 shows an example rotor segment 710. The rotor segment 710 includes a central shaft 1002, permanent magnets 1004 surrounding the central shaft 1002. The rotor segment 710 also includes a first end hub 1006 at a first end of the central shaft 1002 and a second end hub 1008 at a second end of the central shaft 1002. Centrally located within the both the first end hub 1006 and the second end hub 1008 is a first female spline coupling 1010 and a second female spline coupling 1012, respectively. Each female spline coupling is aligned with the central axis 706. Surrounding the permanent magnets 1004 is a sleeve 1014. The sleeve 1014 is designed to contain the magnets 1004 when the rotor segment 710 rotates during operation. The sleeve 1014 can be made out of composite, metal, ceramic, or any other material with sufficient strength to contain the magnets at speed. Though the illustrated rotor segment 710 is a permanent magnet rotor, the electric machine 204 can be constructed with other types of rotor segments. For example, the rotor could be a squirrel cage rotor, a brushed rotor, or any other kind of rotor.

Figure 7:
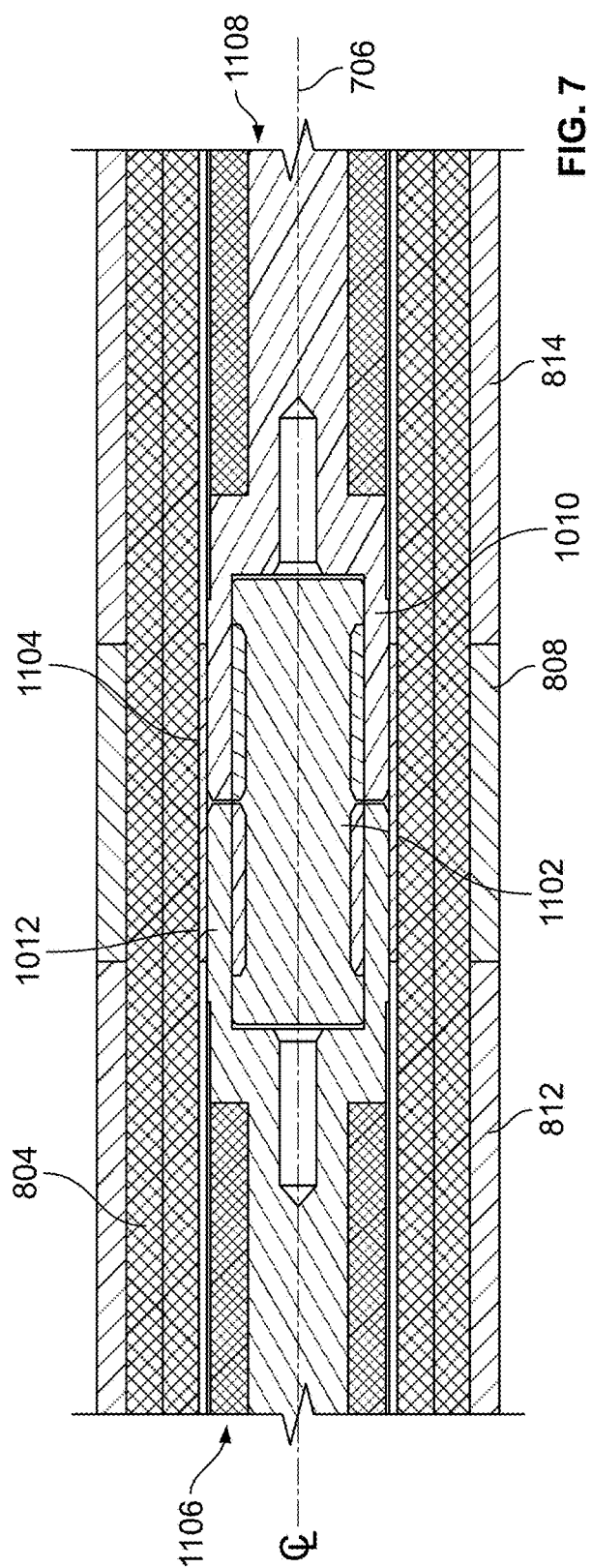
FIG. 7 is a schematic diagram of a side cross-sectional view of an example bearing assembly.

FIG. 7 shows a side cross-sectional view of the rotor segments 710 within the stator assembly 702 A first rotor section 1106 and a second rotor section 1108 are coupled by a male spline coupling 1102. As described above, the first end of the first rotor section 1106 includes the female spline coupling 1010. The male spline coupling 1102 is symmetrical, cylindrical, and has two male ends. A first end of the male spline coupling 1102 couples with the first female spline coupling 1010. Other types of couplings can also be used, such as a flexible disk coupling or any other coupling, to connect rotor sections.

An end of the first rotor section 1106 and an end of the second rotor section 1108 are supported to ride within a radial bearing 1104. In some implementations, a fluid film bearing, or any other radial bearing can be used. Bearing support members 808 surround the bearing 1104 and are positioned in the gap 810 between the first stator section 812 and a second stator section 814. The bearing support member 808 supports the bearing 1104. The bearing 1104 can include a mechanical radial bearing or a magnetic radial bearing. In instances where a mechanical bearing is used, the mechanical radial bearing can include a fluid film bearing or an anti-friction bearing. In instances where a magnetic radial bearing is used, the magnetic radial bearing can include an active magnetic radial bearing or a passive magnetic radial bearing.

The downhole-type electric submersible pump system 124 also includes a housing 714 in which the electric machine 204 resides and a fluid 716 within the housing. For example, the housing 714 can be flooded with, i.e., entirely filled with, the fluid 716. The fluid 716 can maintain an internal pressure within the housing based on an external pressure within the wellbore 104. In some instances, the pressure can be maintained because the fluid 716 is incompressible. In some implementations, the fluid is pressurized before the downhole-type submersible pump 124 is installed within the wellbore 104. The fluid 716 can be a dielectric fluid. A dielectric fluid may be used to fill an annular space between the rotor assembly 708 and the stator assembly 702. In some implementations, the fluid 716 can be utilized to lubricate and cool the bearings 1104, the rotor assembly 708, or the stator assembly 702. The fluid 716 can be either liquid or gas. In some instances, the fluid 716 maintains an internal pressure within the housing 714 regardless of external pressure within the wellbore. The fluid 716 can be a liquid, gas, or include a mixture of liquid and gas phases.

As previously discussed, the downhole-type electric submersible pump system 124 also includes the impeller 712. The impeller 712 is coupled to the electric machine 204 with a coupling and can transfer a rotation between the impeller 712 and the electric machine 204. The electric machine 204 is configured to drive or be driven by the impeller 712.

Figure 8:
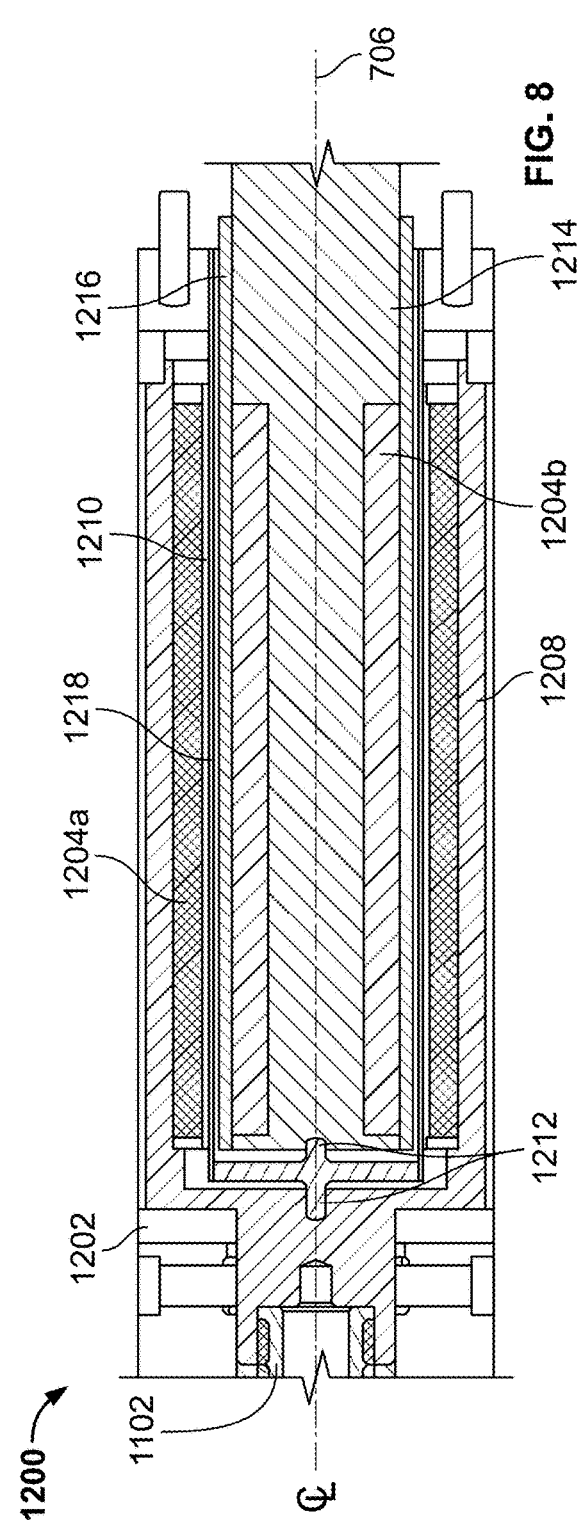
FIG. 8 is a schematic diagram of a side cross-sectional view of an example magnetic coupling.

The coupling between electric machine 204 and impeller 712 can be a magnetic coupling 1200 shown in FIG. 8. The magnetic coupling 1200 includes a female drum 1208 that is positioned at an uphole end of the electric machine 204 and surrounds a male drum 1210 that is directly coupled to the impeller 712. The magnetic coupling 1200 is configured to transmit rotational force to or from a separate rotational device, such as the impeller 712. The female drum is directly coupled to the electric machine 204 with a spline coupling and includes permanent magnets 1204a positioned radially along the female drum 1208. As illustrated, the male drum includes permanent magnets 1204b, mounted on and connected to a male shaft 1214, and positioned radially along the male drum 1210, with poles in relation in number, polarity, and angularly to the female drum permanent magnets 1204a. A protective sleeve 1216 may be used to protect the male permanent magnets 1204b from fluids and/or to provide a smooth surface on the male drum to minimize fluid friction losses. Alternatively or in addition, the protective sleeve 1216 provides retainment forces to hold the permanent magnets on the male shaft 1214 and prevent relative motion between the male shaft 1214 and the male permanent magnets 1204b. As the female drum 1208 rotates, the permanent magnets 1204a impart a rotational force on the male drum permanent magnets 1204b, and thus on 1210, without coming into physical contact. While the illustrated implementation is drawn with permanent magnets on both the male drum 1210 and the female drum 1208, other implementations can include a single set of permanent magnets on either the male drum 1210 or the female drum 1208. An isolation barrier 1218 is located between the female drum 1208 and male drum 1210 and allows for a complete hermetic seal for the electric machine 204. The isolation barrier 1218 includes a rider 1212 to help center the male drum 1210 within the female drum 1208. In some implementations, the male drum 1210 includes steel poles. In some implementations, the female drum 1208 is directly attached to the electric machine 204. In some implementations, the coupling magnets (1204a or 1204b) can include electromagnets instead of or in addition to the permanent magnets 1204a. In some implementations the magnetic coupling 1200 can be located at the downhole end of the electric machine 204. In some implementations, a thrust bearing 1202 is included in the magnetic coupling. The thrust bearing supports any axial loads that may occur within the coupling. While a radial-gap type magnetic coupling is described in the illustrated implementation, a similar system can be used with an axial gap type coupling.

The techniques described here can be implemented to yield a construction that is simply, inexpensive, and physically robust. The pump system can be deployed without special hydraulic or electrical requirements and can be easily retrievable with minimum or no risk of being stuck in the wellbore. The concepts described herein with respect to a pump could also be applied to a compressor. The pump system described here can be implemented in a motor mode to drive the pump or in a generator mode to be driven by the pump A number of implementations have been described. Nevertheless, it will be understood that various modifications may be made. Accordingly, other implementations are within the scope of the following claims.

What is claimed is:

1. A downhole-type electric submersible pump system comprising:
    an electric machine configured to be disposed downhole in a wellbore, the electric machine coupled to rotate with an impeller configured to be disposed downhole in the wellbore, the electric machine comprising:
        a non-magnetized stator assembly comprising:
            a plurality of stator sections axially arranged along a longitudinal axis of the electric machine, each stator section comprising a plurality of circumferentially arranged, longitudinal segments, each of the plurality of longitudinal segments defining an open slot comprising a radially inwardly facing opening, wherein, within each stator section, each of the plurality of circumferentially arranged, longitudinal segments abut one another along a lateral side thereof; and
            electric machine windings comprising a plurality of conductors, each conductor spanning a length of the stator assembly, the electric machine windings configured to induce a torque in a rotor assembly responsive to receiving electrical power at the stator assembly and each conductor received in the slot of a different one of the plurality of longitudinal segments; and
        the rotor assembly comprising a plurality of rotor sections arranged axially along the longitudinal axis of the electric machine, the rotor assembly carried within and supported to rotate by the stator assembly.

2. The system of claim 1, further comprising a plurality of bore tubes positioned between the stator assembly and the rotor assembly, wherein the plurality of bore tubes support the plurality of conductors at respective inner diameters of the plurality of electric machine windings.

3. The system of claim 1, wherein a first stator section of the plurality of stator sections is spaced apart along the longitudinal axis of the electric machine from a second stator section of the at least two stator sections by a gap, wherein the system further comprises a bearing support positioned in the gap.

4. The system of claim 3, wherein the bearing support is made from an electrically non-conductive material.

5. The system of claim 3, wherein the bearing support is positioned around a portion of a conductor between the first stator section and the second stator section.

6. The system of claim 3, wherein the bearing support comprises a plurality of teeth separated by a slot, wherein the slot is positioned around a portion of the conductor between the first stator section and the second stator section.

7. The system of claim 6, wherein an end of a first rotor section and an end of a second rotor section are supported to ride within a bearing.

8. The system of claim 7, wherein the bearing support surrounds the bearing and is positioned in the gap between a first stator section and a second stator section, the bearing support configured to support the bearing.

9. The system of claim 1, further comprising:
    a housing in which the electric machine is positioned; and
    a fluid within the housing, the fluid being pressurized to a specified pressure prior to the electric machine being disposed in the wellbore.

10. The system of claim 1, further comprising:
    an impeller; and
    a magnetic coupling configured to couple the impeller and the electric machine to transfer a rotation between the impeller and the electric machine.

11. The system of claim 10, wherein the magnetic coupling comprises:
    a male drum mechanically coupled to one of the impeller or the electric rotor assembly;
    a female drum surrounding the male drum, the female drum mechanically coupled to the other of the rotor assembly or the impeller; and
    a plurality of permanent magnets positioned radially around the female drum and the male drum, the permanent magnets configured to magnetically couple the male drum and the female drum, the plurality of permanent magnets configured to exchange torque between the male drum and the female drum.

12. The system of claim 11, wherein an isolation barrier fluidically isolates the male drum and the female drum from each other.

13. The system of claim 12, wherein the isolation barrier comprises non-magnetic material, non-metallic material, metallic material, or composite material.

14. The system of claim 13, wherein the isolation barrier comprises a fiberglass composite, a carbon fiber composite, or graphite.

15. The system of claim 1, wherein the longitudinal segments each comprise a plurality of laminations.

16. The system of claim 1, wherein rotor assembly comprises a spline coupling between two of the plurality of rotor sections, the spline coupling comprising a male set of splines and a mating female set of splines, the female set of splines being integrated into the rotor.

17. The system of claim 1, wherein there is an angular offset between stator sections.

18. The system of claim 17, wherein the angular offset between stator sections is between 1° and 15° degrees.

* * * * *

UNITED STATES PATENT AND TRADEMARK OFFICE
CERTIFICATE OF CORRECTION

PATENT NO. : 10,605,057 B2
APPLICATION NO. : 15/844339
DATED : March 31, 2020
INVENTOR(S) : Co Si Huynh et al.

It is certified that error appears in the above-identified patent and that said Letters Patent is hereby corrected as shown below:

In the Claims

Column 14, Line 54, Claim 18, delete "degrees".

Signed and Sealed this
Twenty-first Day of July, 2020

Andrei Iancu
*Director of the United States Patent and Trademark Office*